US012633059B2

(12) United States Patent
Tung et al.

(10) Patent No.: US 12,633,059 B2
(45) Date of Patent: May 19, 2026

(54) NEURAL NETWORK BASED RECONSTRUCTION OF THREE-DIMENSIONAL REPRESENTATION OF HUMAN BODY FROM AN IMAGE

(71) Applicant: Meta Platforms Technologies, LLC, Menlo Park, CA (US)

(72) Inventors: Tony Tung, San Francisco, CA (US); Marco Pesavento, San Francisco, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 146 days.

(21) Appl. No.: 18/523,677

(22) Filed: Nov. 29, 2023

(65) Prior Publication Data

US 2025/0173966 A1 May 29, 2025

(51) Int. Cl.
*G06T 17/00* (2006.01)
*G06T 3/4007* (2024.01)
(Continued)

(52) U.S. Cl.
CPC ............ *G06T 17/20* (2013.01); *G06T 3/4007* (2013.01); *G06T 7/50* (2017.01);
(Continued)

(58) Field of Classification Search
CPC ......... G06T 17/20; G06T 3/4007; G06T 7/50; G06T 2207/10024; G06T 2207/20081;
(Continued)

(56) References Cited

U.S. PATENT DOCUMENTS 11,200,689 B1 * 12/2021 Smith ..................... G06T 17/00
11,941,772 B2 * 3/2024 Cappello .................. G06T 7/50
(Continued)

FOREIGN PATENT DOCUMENTS

CN 114399601 A * 4/2022 .......... G06F 18/253
CN 110390638 B * 7/2023 .......... G06T 3/4076
(Continued)

OTHER PUBLICATIONS

International Search Report and Written Opinion for International Application No. PCT/US2024/049166, mailed Feb. 5, 2025, 12 pages.
(Continued)

*Primary Examiner* — Benny Q Tieu
(74) *Attorney, Agent, or Firm* — Seyfarth Shaw LLP

(57) ABSTRACT

A system reconstructs accurate three-dimensional (3D) representation of human body from a single-view RGB-D image that includes color information and depth information. The system uses the depth information to generate a three-dimensional voxel grid and align image features with the voxels to generate voxel aligned features. The system learns geometric details of a human body from both pixel-aligned features and voxel-aligned features. The system integrates surface normal and human body semantic information to increase the accuracy of the reconstructed human body shapes. The system generates a high-fidelity 3D human shape that present high level of details that are significantly close to 3D scan captures.

20 Claims, 8 Drawing Sheets

400

Receive an input image including color information and depth information of a human body
410

Generate a set of high-resolution features from the color information of the input image
420

Generate a set of low-resolution features from the color information of the input image
430

Generate a 3D voxel grid from the depth information
440

Generate a set of voxel-aligned features from the voxel grid and the set of low-resolution features
450

Generate a signed depth field of the human body shape based on the pixel-aligned features and the voxel-aligned features
460

(51) Int. Cl.
    *G06T 7/50*          (2017.01)
    *G06T 17/20*       (2006.01)

(52) U.S. Cl.
    CPC .............. *G06T 2207/10024* (2013.01); *G06T 2207/20081* (2013.01); *G06T 2207/20084* (2013.01); *G06T 2207/30196* (2013.01); *G06T 2210/36* (2013.01); *G06T 2210/56* (2013.01)

(58) Field of Classification Search
    CPC . G06T 2207/20084; G06T 2207/30196; G06T 2210/36; G06T 2210/56; G06T 17/00
    USPC ........................................................ 345/423
    See application file for complete search history.

(56) References Cited

U.S. PATENT DOCUMENTS

2021/0256776 A1 * 8/2021 Cappello .................. G06T 7/50

2022/0157016 A1 * 5/2022 Sharma ................... G06T 15/04
2022/0230383 A1 * 7/2022 Tian ........................ G06V 10/26
2022/0327767 A1 * 10/2022 He ........................ G06V 10/454

FOREIGN PATENT DOCUMENTS

CN        117315153 A  * 12/2023  ............. G06T 17/00
WO    WO-2020053551 A1 * 3/2020  ............. G06T 19/20

OTHER PUBLICATIONS

Slavcheva M., et al., "Variational Level Set Evolution for Non-rigid 3D Reconstruction from a Single Depth Camera," IEEE Transactions on Pattern Analysis and Machine Intelligence, Feb. 24, 2020, [Retrieved on Jul. 1, 2021], vol. 43, No. 8, pp. 2838-2850.
Zhao X., et al., "Occupancy Planes for Single-view RGB-D Human Reconstruction," Proceedings of the AAAI Conference on Artificial Intelligence, Dec. 1, 2022, 10 Pages.

* cited by examiner

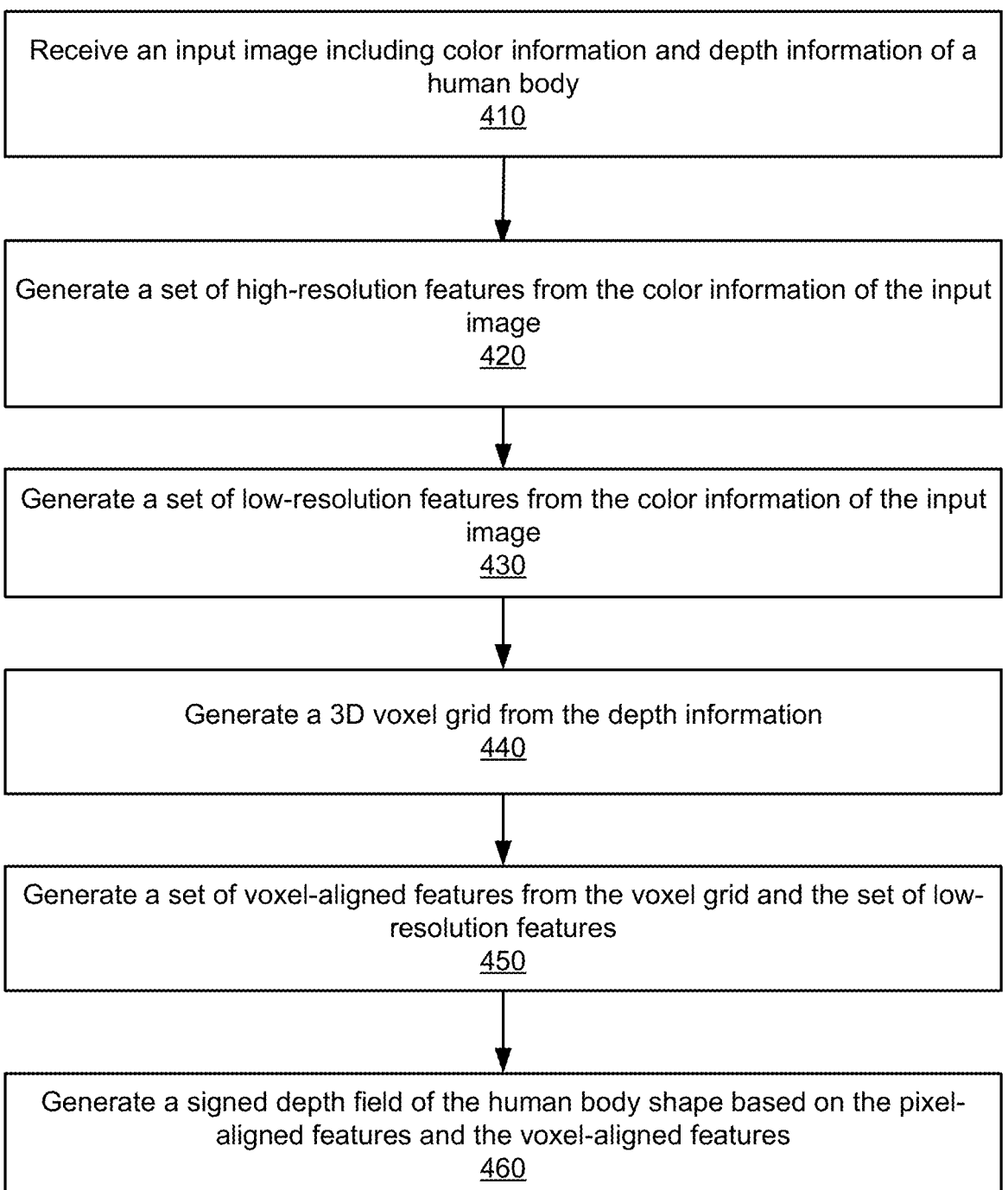

400

Receive an input image including color information and depth information of a human body
410

Generate a set of high-resolution features from the color information of the input image
420

Generate a set of low-resolution features from the color information of the input image
430

Generate a 3D voxel grid from the depth information
440

Generate a set of voxel-aligned features from the voxel grid and the set of low-resolution features
450

Generate a signed depth field of the human body shape based on the pixel-aligned features and the voxel-aligned features
460

NEURAL NETWORK BASED RECONSTRUCTION OF THREE-DIMENSIONAL REPRESENTATION OF HUMAN BODY FROM AN IMAGE

FIELD OF THE INVENTION

This disclosure relates generally to image processing, and more specifically to for neural network-based reconstruction of three-dimensional representation of human body from an image.

BACKGROUND

Due to increase in the availability of augmented reality (AR) or virtual reality (VR) devices such as AR/VR headsets and AR/VR glasses, there is increase in interest for 3D virtual world creation. This has resulted in a substantial demand for easily accessible 3D reconstruction of human body shapes, for example, for building 3D avatars of real people. Such reconstructed human shapes may be used in applications such as artificial reality or virtual reality gaming, medical applications, content generation, and so on. A challenge in creating such 3D representations of human shapes is the accuracy of the reconstruction methods. Known techniques either require sophisticated equipment, for example, sensors to capture the input data needed for 3D reconstruction or produce low quality or generate inaccurate 3D representations of human body shapes that lack details.

SUMMARY

A system reconstructs accurate three-dimensional (3D) representation of a human body shape from a single-view RGB-D image of the human body shape that include color information and depth information. A machine learning based model predicts a signed distance function used for 3D reconstruction of the human body shape. The system learns accurate geometric details of a human body from pixel-aligned features and voxel-aligned features.

According to an embodiment, the machine learning based model receives an input image showing a human body shape. The input image includes color information and depth information of pixels. The model generates a set of high-resolution features and a set of low-resolution features from the color information of the input image. The model generates a three-dimensional voxel grid from the depth information of the input image. The model generates a set of voxel-aligned features from the three-dimensional voxel grid and the set of low-resolution features extracted from the input image. The model generates a signed depth field of the human body shape shown from the set of high-resolution features and the set of voxel-aligned features. The signed depth field represents a value based on a distance of a point from the surface of the human body shape.

According to an embodiment, the system trains the model by performing semantic aware sampling. The system determines body parts associated with different portions of the input image. A set of three-dimensional points are determined based on the input image such that the density of the three-dimensional points associated with a portion of the input image is based on a type of body part associated with the portion of the input image. The system uses the set of three-dimensional points for training the model.

BRIEF DESCRIPTION OF THE DRAWINGS

FIG. 4 is a flowchart of a process of predicting a signed distance function based on the model, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A system reconstructs accurate three-dimensional (3D) representation of a human body from a single-view RGB-D image. The RGB-D image includes color information and depth information. The system learns accurate geometric details of a human body from both pixel-aligned features and voxel-aligned features. The voxel-aligned features leverage depth information and enables spatial relationships to be learned in three-dimensions, thereby mitigating depth ambiguities. The system further integrates surface normal and human body semantic information to increase the accuracy of the reconstructed human body shapes. The techniques disclosed allow the system to generate high-fidelity 3D human shapes that present high level of details that are significantly close to 3D scan captures.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Figure 1A:
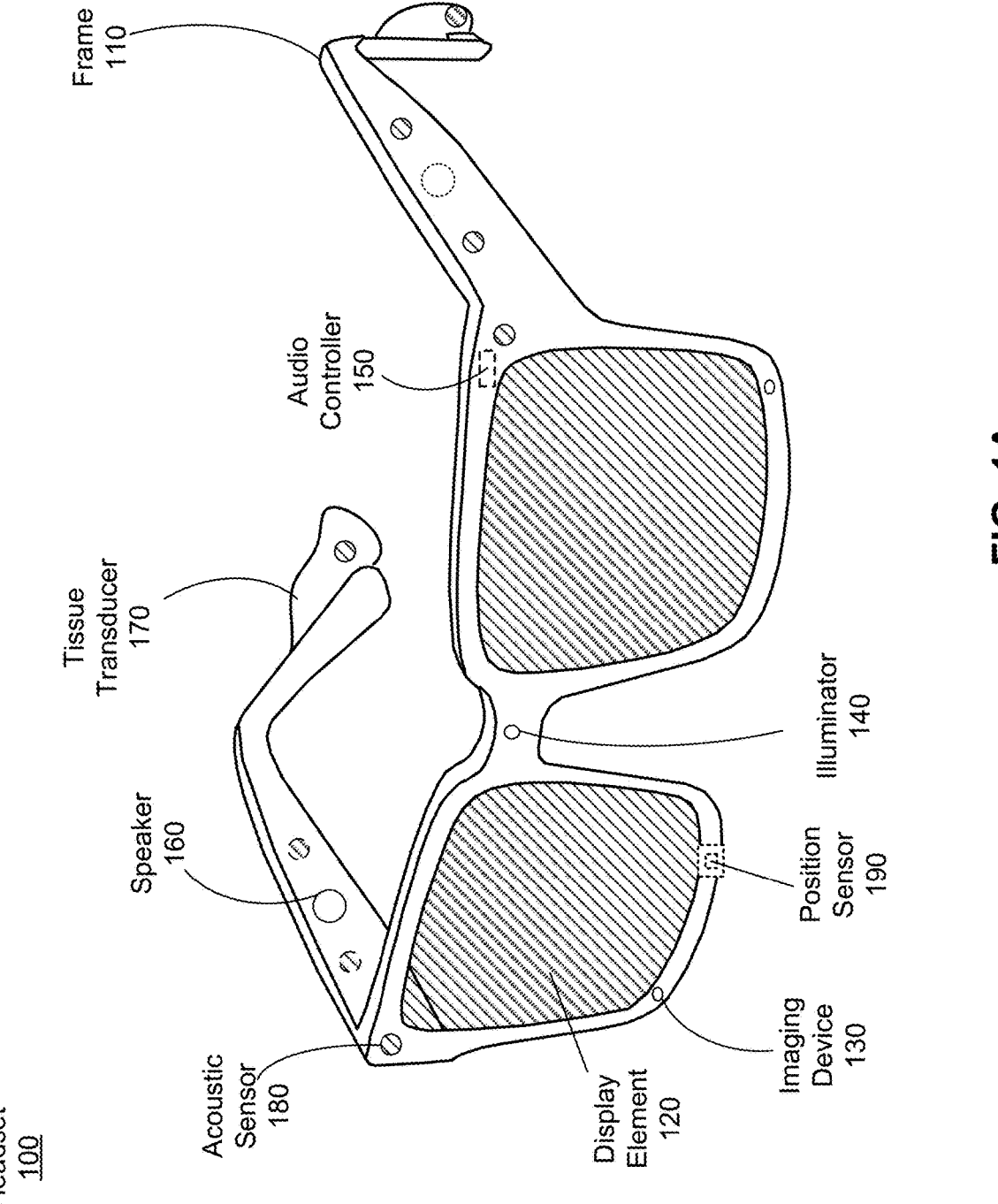
FIG. 1A is a perspective view of a headset implemented as an eyewear device, in accordance with one or more embodiments.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 7.

Figure 1B:
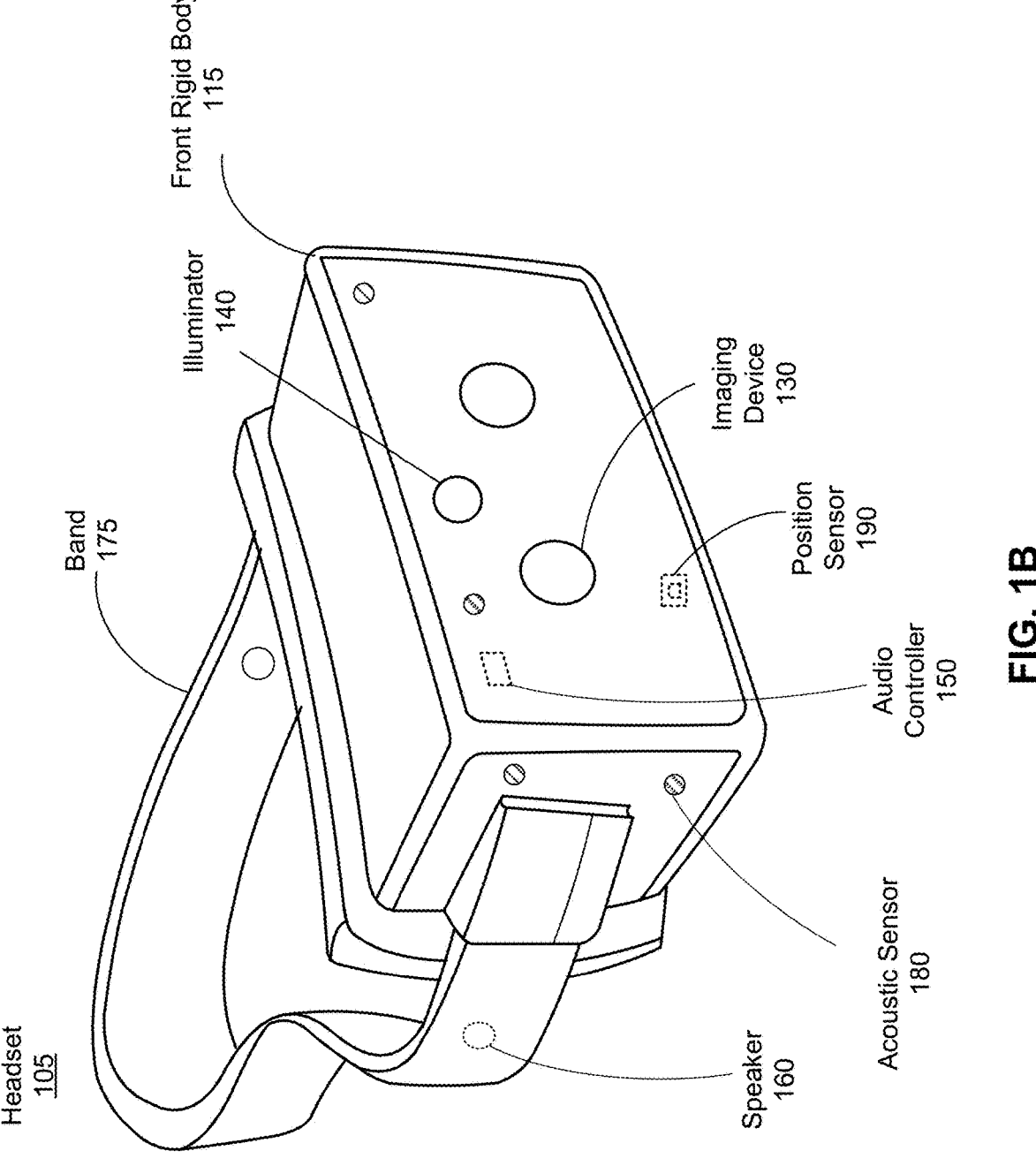
FIG. 1B is a perspective view of a headset implemented as a HMD (head mounted display), in accordance with one or more embodiments.

FIG. 1B is a perspective view of a headset 105 implemented as a HMD (head mounted display), in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

The devices shown in FIG. 1A and FIG. 1B may be used to show 3D human shapes as part of mixed reality or artificial reality content. For example, an avatar of a human may be shown superimposed over content that was previously generated or captured using a camera or superimposed over the scene surrounding the user. The machine learning based model disclosed herein may be used to generate 3D human shapes that are used in such content. Such content may be used for gaming, medical use, interactive content, and so on. The ability to generate high resolution 3D human shapes results in better user experience.

Figure 2:
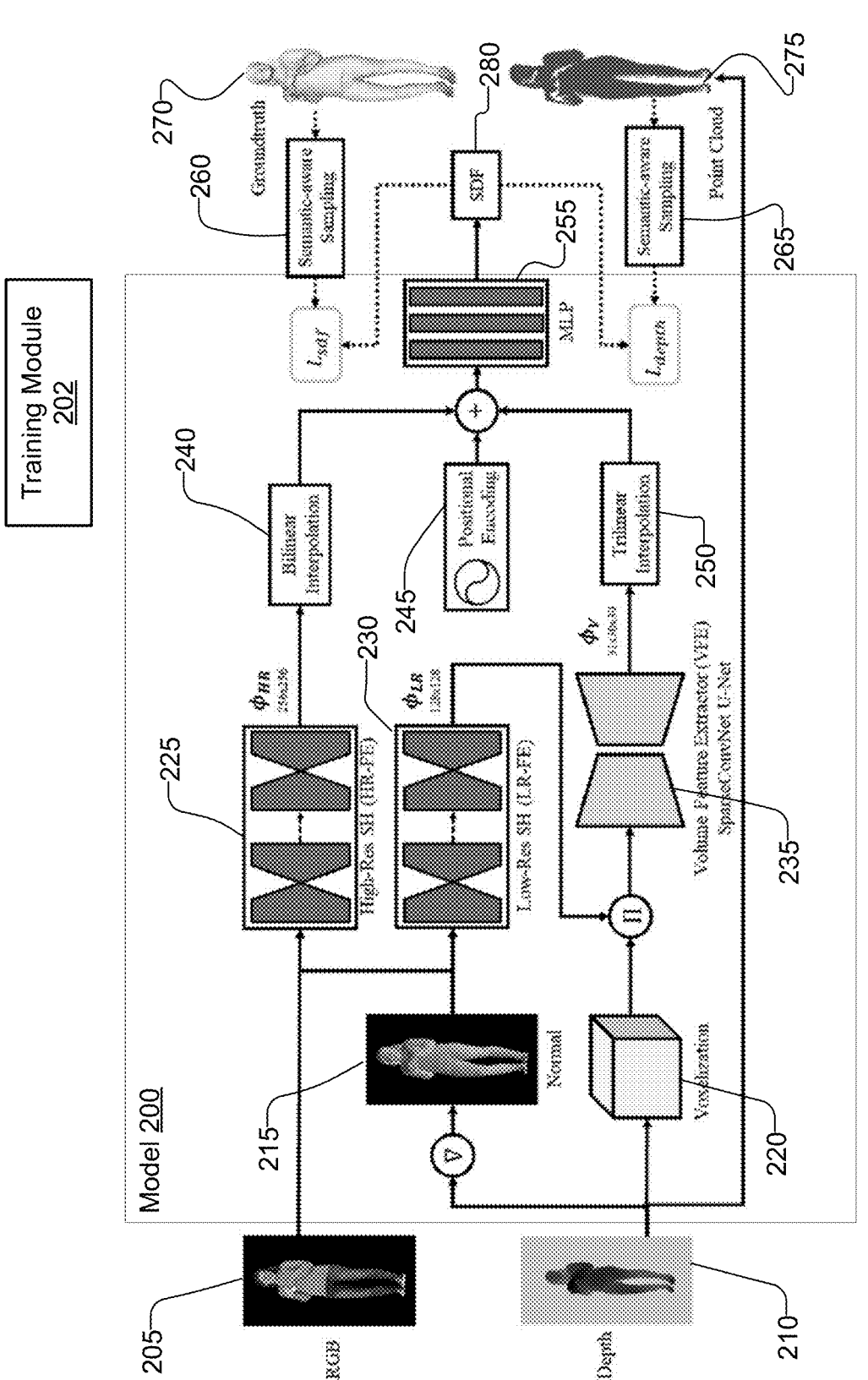
FIG. 2 shows the architecture of a machine learning based model for reconstruction of 3D human shapes from a single RBGD image, according to an embodiment.
Figure 5:
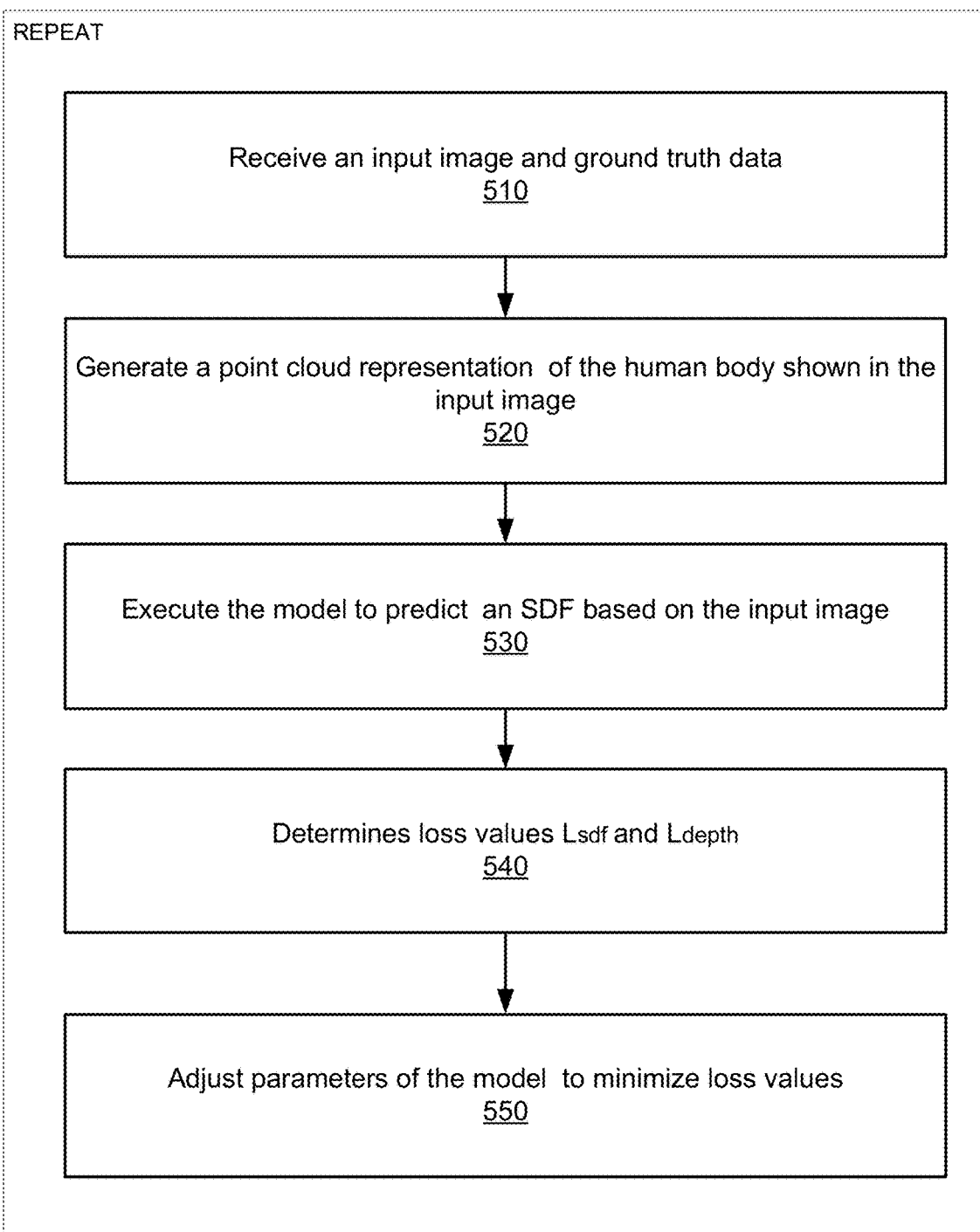
FIG. 5 is a flowchart of a process of training the model, in accordance with one or more embodiments.

FIG. 2 shows the architecture of a machine learning based model for reconstruction of 3D human shapes from a single RBGD image, according to an embodiment. FIG. 2 also shows a training module 202 that performs the training of the model 200. The process of training the model 200 is illustrated in FIG. 5 and described in connection with FIG. 5 and the process of executing the model 200 is shown in FIG. 4 and described in connection with FIG. 4.

The machine learning based model 200 may also be referred to herein as a model. The implicit function $f$ may represent a continuous function that is obtained by training the model 200 on discretely represented samples of the same function. Although specific components of the machine learning based model are illustrated in the architecture illustrated in FIG. 2, other embodiments may use different components than those indicated herein.

The machine learning based model 200 shown in FIG. 2 learns an implicit function $f$ to reconstruct accurate and high-fidelity shapes of humans from a single RGB-D image. The value $f(x)$ of a 3D point x denotes the distance of the point x to its closest surface. Therefore, the human body surface could be defined as the zero level-set of function $f$, defined as follows.

$$f(X) = 0, X = \{x_i : x_i \in \mathbb{R}^3, i = 0, 1, \ldots, N\} \qquad (3)$$

Given a set X of 3D surface points located on a 3D grid with arbitrary resolution, the system extracts the reconstructed body surface S.

The model 200 receives RGB-D image of a human body that includes color information 205 and depth information 210. An RGB-D image includes color information represented by R (red, G (green), B (blue) components for each pixel as well as depth information represented by a D (depth) component. Accordingly, an RGB-D image provides a per-pixel depth information aligned with corresponding image pixels.

The model uses depth information 210 to generate normals 215 to the surfaces of the human body displayed in the image. The voxelization component 220 uses the depth information 210 to generate a 3D voxel grid corresponding to the human body displayed in the image. A voxel represents a value on a grid in three-dimensional space and may be considered as a 3D pixel. Learning spatial relationships in 3D space helps solve the problems of depth ambiguity caused by the single-view input.

A high-resolution stacked hourglass component 225 of the model 200 receives the color information 205 and the normals 215 as input. The high-resolution stacked hourglass component 225 generates a set of high-resolution features, also referred to as fine level appearance features, appearance features, or pixel aligned features. The model may perform bilinear interpolation 240 on the appearance features to increase the number of data points on a two-dimensional plane corresponding to the input image. For example, the high-resolution stacked hourglass component 225 outputs an embedding of resolution 256×256 while the resolution of the features obtained from low-resolution stacked hourglass component 230 is 128×128. An hourglass component has symmetric topology and roughly equal distribution layers that perform processing from high resolutions to low resolutions and layers that perform processing from low resolutions to high resolutions. A stacked hourglass component stacks multiple such hourglass components.

A low-resolution stacked hourglass component 230 of the model 200 receives the color information 205 and the normals 215 as input. The low-resolution stacked hourglass component 230 generates a set of low-resolution features or coarse level appearance features. The coarse level appearance features may also be referred to as pixel-aligned low-resolution features.

The model 200 combines the 3D voxel grid with the coarse level appearance features by concatenating each voxel with a corresponding pixel-aligned low-resolution image-space features. The sparse convolutional neural network component 235 of the model 200 receives the 3D voxel grid along with the coarse level appearance features as input and generates a set of geometry features of the human body. A trilinear interpolation 240 is performed on the geometry features to increase the number of data points on a three-dimensional grid corresponding to the input image.

A multi-layered perceptron component 255 of the model 200 receives the appearance features, positional encodings, and geometry features as input predicts a signed distance field (SDF) 280 representing the 3D human shape shown in the input image. A multi-layered perceptron (MLP) is a feed forward neural network that includes multiple layers an input layer, an output layer and one or more hidden layers. The signed distance field value represents the distance between a point and the surface of the 3D representation of the human body. The value of the SDF at a point outside the 3D representation of the human body is a positive value; the value of the SDF at a point inside the 3D representation of the human body is a negative value; and the value of the SDF at a point on the 3D representation of the human body is zero.

The training module 202 performs training of the machine learning model by repeatedly executing the model using training data, computing one or more loss values representing a difference between the predicted output and labeled data, and adjusting parameters of various components of the model 200 to minimize the loss values 19. The training module performs semantic aware sampling of data points for determining loss functions for training the model.

The system may learn the function f using a fixed set of 3D points obtained using uniform sampling. If the system uses sampling that is homogeneous around the shape, smaller parts of the body such as fingers, nose and lips have significantly less 3D sampled points and thus, fail to reconstruct these parts adequately. Therefore, the system performs semantic aware sampling. Accordingly, the system associates specific subsets of neighboring 3D points determines with specific body parts. The system may determine a semantic mask from the RGB image by performing body-part segmentation for the whole body.

The system projects the 3D points $X_b$ sampled around the surface S on the 2D image displaced with a Gaussian noise. The system identifies body parts that need higher rate of sampling of points, for example, fingers, face, and so on. If a point or a subset of points corresponds to a body part that needs higher rate of sampling, the system samples additional points. The following equation represents the points determined using semantic aware sampling.

$$X_t = \begin{cases} X_b + \text{Add}(X_{hh}), & \text{if } N_{X_{hh}} <= N_{X_b}/2, \\ X_b + \text{Add}(X_{hh})[0:N_{X_b}/2], & \text{otherwise,} \end{cases} \quad (2)$$

In this equation $X_t$ is the final number of sampled points, $X_{hh}$ represents the semantic points corresponding to specific body parts identified for denser sampling, for example, hands and face, $X_b$ are the points sampled in the body, $N_{Xb}$ is the number of points in $X_b$, $N_{Xhh}$ is the number of points in $X_{hh}$ and Add is defined as an $N_K$-steps recursion addition: $X_{hh}=X_{hh}+\text{Add}(X_{hh}+N(0, \sigma_{HR}))$ with $\sigma_{HR}<\sigma_{LR}$ in order to sample closer to the surface where there are fine details.

Figures 3A, 3B:
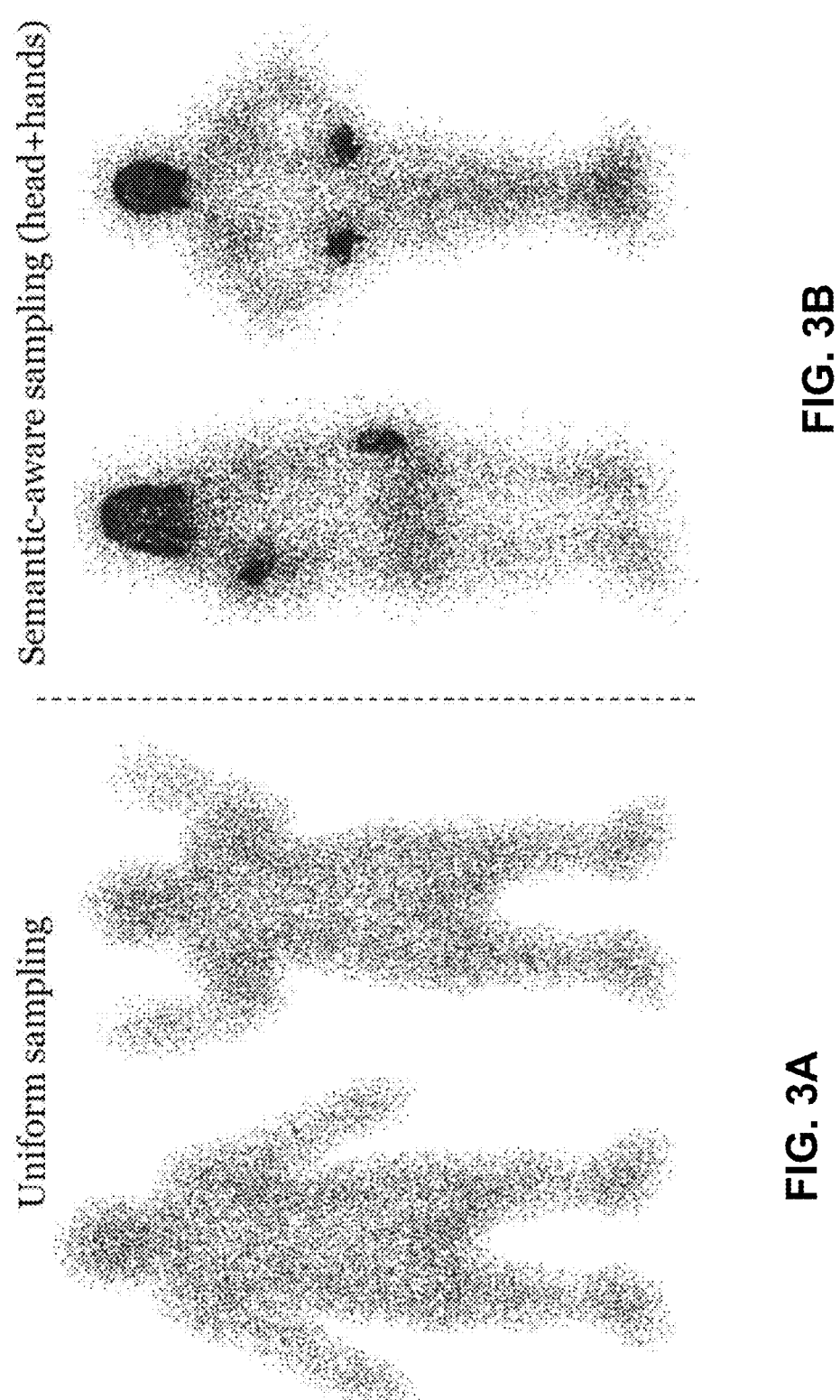
FIG. 3A illustrates uniform sampling of points in a representation of human body, according to an embodiment.
FIG. 3B illustrates semantic-aware sampling used for training the model for 3D reconstruction of human shape, according to an embodiment.

FIGS. 3A and 3B illustrate the difference between uniform sampling and semantic aware sampling. FIG. 3A illustrates uniform sampling of points in a representation of human body, according to an embodiment. As shown in FIG. 3A, all parts of the body are sampled at the same rate. A model trained using such a sampling produces the same level of details for various parts of body independent of the type of body part.

FIG. 3B illustrates semantic-aware sampling used for training the model for 3D reconstruction of human shape, according to an embodiment. As shown in FIG. 3A, 3B, specific regions of body, for example, hands and face are sampled to have more points compared to other parts. Accordingly, the density of the set of three-dimensional points associated with a portion of the input image is determined based on a type of body part associated with the portion of the input image. For example, certain parts such as the face and hands may have higher density compared to other parts such as legs. As a result, training a model using such semantic aware sampling allows the model to perform a 3D reconstruction that represents finer details for specific body parts such as hand and face using a learned implicit function.

FIG. 4 is a flowchart of a process 400 of predicting a signed distance function based on the model 200, in accordance with one or more embodiments. The process or method shown in FIG. 4 may be performed by components of the model 200. Other entities may perform some or all the steps in FIG. 4 in other embodiments. Embodiments may include different and/or additional steps or perform the steps in different orders.

The model 200 receives 410 an input image including a human body. The input image includes color information 205 and depth information 210. The high-resolution stacked hourglass component 225 generates 420 a set of high-resolution features from the color information of the input image. The low-resolution stacked hourglass component 230 generates 430 a set of low-resolution features from the color information of the input image. The voxelization component 220 uses the depth information 210 to generate 440 a 3D voxel grid corresponding to the human body displayed in the image from the depth information 210. The sparse convolutional neural network component 235 generates 450 a set of voxel-aligned features from the voxel grid and the set of low-resolution features extracted from the input image. The multi-layered perceptron component 255 generates 460 a signed depth field of the human body shown in the input image based on the pixel-aligned features and the voxel-aligned features.

FIG. 5 is a flowchart of a process 500 of training the model 200, in accordance with one or more embodiments.

The process or method shown in FIG. 5 may be performed by components of the model 200. Other entities may perform some or all the steps in FIG. 5 in other embodiments. Embodiments may include different and/or additional steps or perform the steps in different orders.

The model 200 receives 510 an input image and a corresponding ground truth representation 270 of the human body shown in the input image. The depth information 210 of the input image is used to generate 520 a point cloud representation 275 of the human body shown in the input image. The training module 202 executes 530 the model 200 using the process shown in FIG. 4 to predict 530 an SDF based on the input image. The training module 202 determines 540 two loss values $L_{sdf}$ and $L_{depth}$ based on the predicted SDF. The training module 202 adjusts 550 the parameters of the model 200 to minimize the two loss values for the training data. The steps 510, 520, 5630, 540, 550 are repeated for the training data available.

The loss value $L_{sdf}$ represents the difference between the predicted SDF and an SDF representing the ground truth data available in the training data. The ground truth data may be obtained using higher quality depth sensors, for example, lidars. The loss value $L_{depth}$ represents the difference between value of the predicted SDF for points on the surface of the 3D representation of the human body and the corresponding SDF value for the points on the point cloud representation 275 determined from the depth information 210. The semantic aware sampling strategy described herein is used for sampling the points of the point cloud for training the model 200.

According to an embodiment, the loss functions are Huber loss functions but may be other loss functions such as mean square error function or mean absolute error function. The Huber loss function determines the loss value using the mean square error function if the loss value is below a threshold. If the loss value is greater than the threshold, the Huber loss function determines the loss value using the mean absolute error function. Using the mean absolute error function for large loss values mitigates the weight on outliers.

Figure 6:
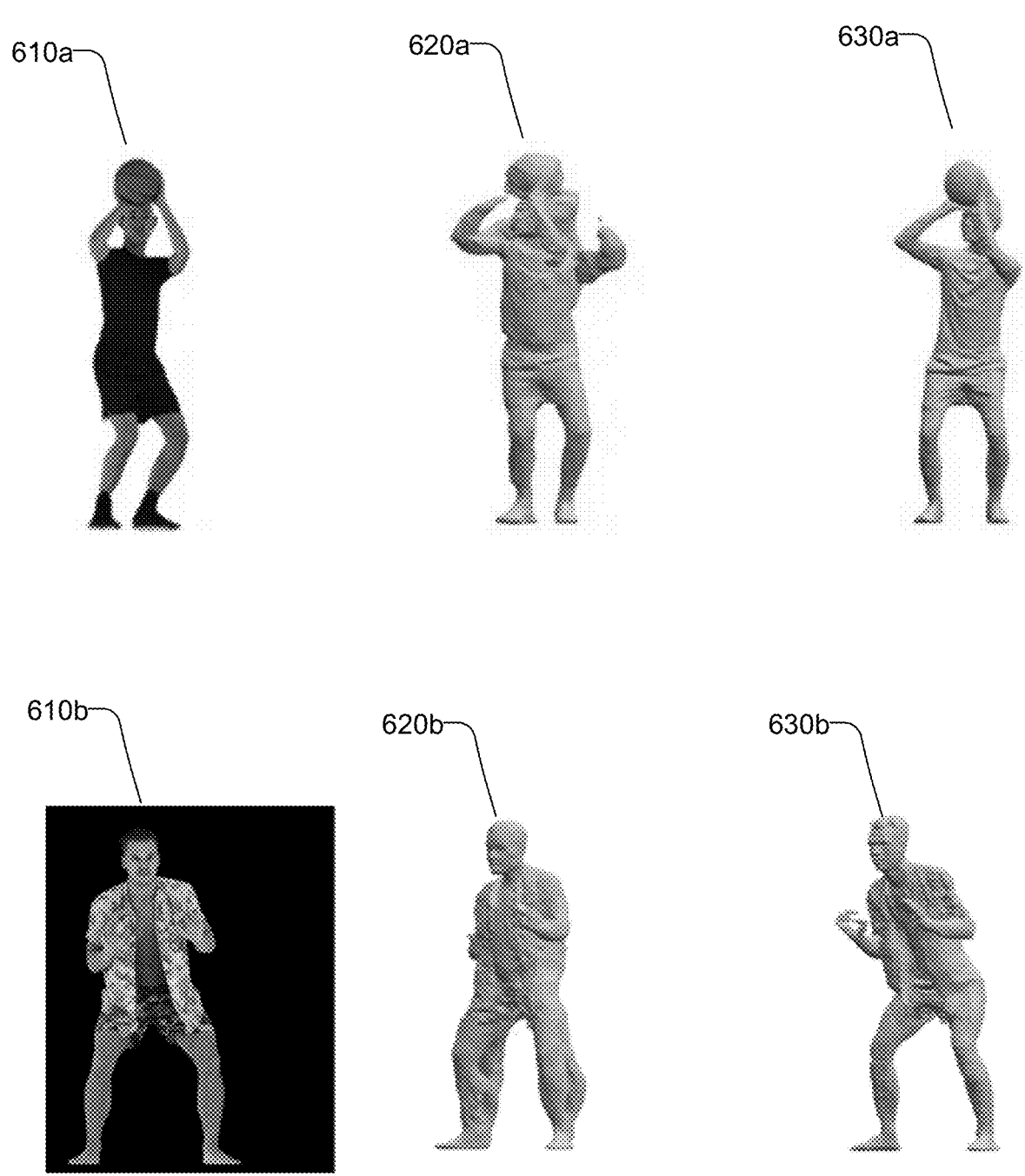
FIG. 6 compares the result of 3D reconstruction from an image using the model 200 with a conventional technique, according to an embodiment.

FIG. 6 compares the result of 3D reconstruction from an image using the model 200 with a conventional technique, according to an embodiment. The input images 610a, 610b are converted to 3D human shapes 620a, 620b using conventional techniques and also the 3D human shapes 630a, 630b using the model 200 disclosed herein. As shown in FIG. 6, the 3D human shapes 620a, 620b generated using the conventional technique show significant distortion and inaccurate reconstruction compared to the 3D human shape 630a, 630b generated using model 200. Furthermore, the 3D human shapes 630a, 630b generated using model 200 show finer details that are not shown in the 3D human shapes 620a, 620b generated using the conventional technique. For example, the side view of the 3d human shape 620a is inaccurate compared to the side view of the 3d human shape 620b, the legs of the 3d human shape 620a have significant distortion compared to the legs of the 3d human shape 620b, and so on.

The model 200 as disclosed herein performs better in comparison to models that do not use the techniques disclosed herein. The reconstruction accuracy of the systems was compared using three quantitative metrics: (1) the average point-to-surface Euclidean distance (P2S), (2) the normal reprojection error (NORMAL), and (3) the Chamfer distance (CD), in cm.

The following table compares the results of various techniques. The system S1 (2D LR only) uses only color information 205 and normals 215 with low-resolution hourglass component 225. The system S2 (2D HR only) uses only color information 205 and normals 215 with high-resolution hourglass component 225. For both S1 and S2, the depth information 210 is not considered and the sparse convolutional neural network component 235 is not implemented. The system S3 (3D only) uses depth information 210 only without using low-resolution hourglass component 225 and high-resolution hourglass component 225 and without using color information 205 and normals 215. The system S4 (w/o $L_{depth}$) demonstrate the effectiveness of the depth-supervision, by training the model just with the $L_{sdf}$ loss. The system S5 (w rand feature) links random features to the voxel as input to the sparse convolutional neural network component 235 to illustrate whether having features retrieved from the input depth map improves the performance. The system S5 (w rand feature). The system S6 is model 200 with all the features disclosed herein.

TABLE I

| System | CD | NORMAL | P2S |
|---|---|---|---|
| S1 (2D LR only) | 2.653 | .5611 | 2.682 |
| S2 (2D HR only) | 2.170 | .5131 | 1.973 |
| S3 (3D only) | 3.021 | .6302 | 2.715 |
| S4 (w/o $L_{depth}$) | 2.060 | .5647 | 1.956 |
| S5 (w rand feature) | 2.136 | .5081 | 1.947 |
| S6 (model 200) | 2.075 | .4990 | 1.936 |

The performance shown in the table I illustrates that the system S6 based on model 200 that includes all the techniques disclosed herein performs better than almost all other system based on the various metrics CD, NORMAL, and P2S. The performance measurements illustrate the impact of the various features of the performance of the system. As shown by the performance measurements the model 200 improves the performance compared to systems that do not use the techniques disclosed.

Figure 7:
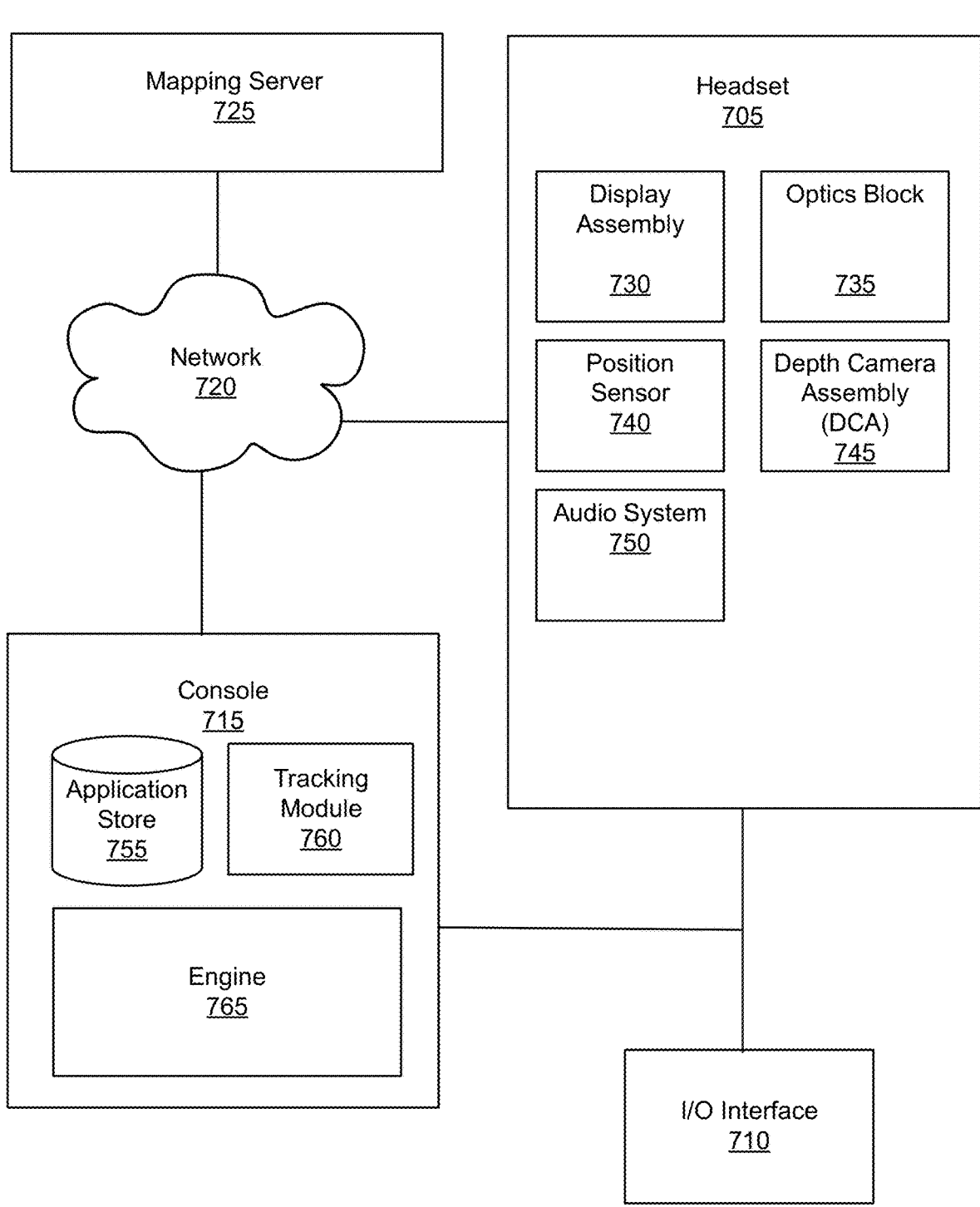
FIG. 7 is a system that includes a headset, in accordance with one or more embodiments.

FIG. 7 is a system 700 that includes a headset 705, in accordance with one or more embodiments. In some embodiments, the headset 705 may be the headset 100 of FIG. 1A or the headset 105 of FIG. 1B. The system 700 may operate in an artificial reality environment (e.g., a virtual reality environment, an augmented reality environment, a mixed reality environment, or some combination thereof). The system 700 shown by FIG. 7 includes the headset 705, an input/output (I/O) interface 710 that is coupled to a console 715, the network 720, and the mapping server 725. While FIG. 7 shows an example system 700 including one headset 705 and one I/O interface 710, in other embodiments any number of these components may be included in the system 700. For example, there may be multiple headsets each having an associated I/O interface 710, with each headset and I/O interface 710 communicating with the console 715. In alternative configurations, different and/or additional components may be included in the system 700. Additionally, functionality described in conjunction with one or more of the components shown in FIG. 7 may be distributed among the components in a different manner than described in conjunction with FIG. 7 in some embodiments. For example, some or all of the functionality of the console 715 may be provided by the headset 705.

The headset 705 includes the display assembly 730, an optics block 735, one or more position sensors 740, and the DCA 745. Some embodiments of headset 705 have different components than those described in conjunction with FIG. 7. Additionally, the functionality provided by various components described in conjunction with FIG. 7 may be differently distributed among the components of the headset 705 in other embodiments, or be captured in separate assemblies remote from the headset 705.

The display assembly 730 displays content to the user in accordance with data received from the console 715. The display assembly 730 displays the content using one or more display elements (e.g., the display elements 120). A display element may be, e.g., an electronic display. In various embodiments, the display assembly 730 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 735.

The optics block 735 may magnify image light received from the electronic display, corrects optical errors associated with the image light, and presents the corrected image light to one or both eyeboxes of the headset 705. In various embodiments, the optics block 735 includes one or more optical elements. Example optical elements included in the optics block 735 include: an aperture, a Fresnel lens, a convex lens, a concave lens, a filter, a reflecting surface, or any other suitable optical element that affects image light. Moreover, the optics block 735 may include combinations of different optical elements. In some embodiments, one or more of the optical elements in the optics block 735 may have one or more coatings, such as partially reflective or anti-reflective coatings.

Magnification and focusing of the image light by the optics block 735 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 735 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 735 corrects the distortion when it receives image light from the electronic display generated based on the content.

The position sensor 740 is an electronic device that generates data indicating a position of the headset 705. The position sensor 740 generates one or more measurement signals in response to motion of the headset 705. The position sensor 190 is an embodiment of the position sensor 740. Examples of a position sensor 740 include: one or more IMUs, one or more accelerometers, one or more gyroscopes, one or more magnetometers, another suitable type of sensor that detects motion, or some combination thereof. The position sensor 740 may include multiple accelerometers to measure translational motion (forward/back, up/down, left/ right) and multiple gyroscopes to measure rotational motion (e.g., pitch, yaw, roll). In some embodiments, an IMU rapidly samples the measurement signals and calculates the estimated position of the headset 705 from the sampled data. For example, the IMU integrates the measurement signals received from the accelerometers over time to estimate a velocity vector and integrates the velocity vector over time to determine an estimated position of a reference point on the headset 705. The reference point is a point that may be used to describe the position of the headset 705. While the reference point may generally be defined as a point in space, however, in practice the reference point is defined as a point within the headset 705.

The DCA 745 generates depth information for a portion of the local area. The DCA includes one or more imaging devices and a DCA controller. The DCA 745 may also include an illuminator. Operation and structure of the DCA 745 is described above with regard to FIG. 1A.

The audio system 750 provides audio content to a user of the headset 705. The audio system 750 may comprise one or acoustic sensors, one or more transducers, and an audio controller. The audio system 750 may provide spatialized audio content to the user. In some embodiments, the audio system 750 may request acoustic parameters from the mapping server 725 over the network 720. The acoustic parameters describe one or more acoustic properties (e.g., room impulse response, a reverberation time, a reverberation level, etc.) of the local area. The audio system 750 may provide information describing at least a portion of the local area from e.g., the DCA 745 and/or location information for the headset 705 from the position sensor 740. The audio system 750 may generate one or more sound filters using one or more of the acoustic parameters received from the mapping server 725, and use the sound filters to provide audio content to the user.

The I/O interface 710 is a device that allows a user to send action requests and receive responses from the console 715. An action request is a request to perform a particular action. For example, an action request may be an instruction to start or end capture of image or video data, or an instruction to perform a particular action within an application. The I/O interface 710 may include one or more input devices. Example input devices include: a keyboard, a mouse, a game controller, or any other suitable device for receiving action requests and communicating the action requests to the console 715. An action request received by the I/O interface 710 is communicated to the console 715, which performs an action corresponding to the action request. In some embodiments, the I/O interface 710 includes an IMU that captures calibration data indicating an estimated position of the I/O interface 710 relative to an initial position of the I/O interface 710. In some embodiments, the I/O interface 710 may provide haptic feedback to the user in accordance with instructions received from the console 715. For example, haptic feedback is provided when an action request is received, or the console 715 communicates instructions to the I/O interface 710 causing the I/O interface 710 to generate haptic feedback when the console 715 performs an action.

The console 715 provides content to the headset 705 for processing in accordance with information received from one or more of: the DCA 745, the headset 705, and the I/O interface 710. In the example shown in FIG. 7, the console 715 includes an application store 755, a tracking module 760, and an engine 765. Some embodiments of the console 715 have different modules or components than those described in conjunction with FIG. 7. Similarly, the functions further described below may be distributed among components of the console 715 in a different manner than described in conjunction with FIG. 7. In some embodiments, the functionality discussed herein with respect to the console 715 may be implemented in the headset 705, or a remote system.

The application store 755 stores one or more applications for execution by the console 715. An application is a group of instructions, that when executed by a processor, generates content for presentation to the user. Content generated by an application may be in response to inputs received from the user via movement of the headset 705 or the I/O interface 710. Examples of applications include: gaming applications, conferencing applications, video playback applications, or other suitable applications.

The tracking module 760 tracks movements of the headset 705 or of the I/O interface 710 using information from the DCA 745, the one or more position sensors 740, or some combination thereof. For example, the tracking module 760 determines a position of a reference point of the headset 705 in a mapping of a local area based on information from the headset 705. The tracking module 760 may also determine positions of an object or virtual object. Additionally, in some embodiments, the tracking module 760 may use portions of data indicating a position of the headset 705 from the position sensor 740 as well as representations of the local area from the DCA 745 to predict a future location of the headset 705. The tracking module 760 provides the estimated or predicted future position of the headset 705 or the I/O interface 710 to the engine 765.

The engine 765 executes applications and receives position information, acceleration information, velocity information, predicted future positions, or some combination thereof, of the headset 705 from the tracking module 760. Based on the received information, the engine 765 determines content to provide to the headset 705 for presentation to the user. For example, if the received information indicates that the user has looked to the left, the engine 765 generates content for the headset 705 that mirrors the user's movement in a virtual local area or in a local area augmenting the local area with additional content. Additionally, the engine 765 performs an action within an application executing on the console 715 in response to an action request received from the I/O interface 710 and provides feedback to the user that the action was performed. The provided feedback may be visual or audible feedback via the headset 705 or haptic feedback via the I/O interface 710.

The network 720 couples the headset 705 and/or the console 715 to the mapping server 725. The network 720 may include any combination of local area and/or wide area networks using both wireless and/or wired communication systems. For example, the network 720 may include the Internet, as well as mobile telephone networks. In one embodiment, the network 720 uses standard communications technologies and/or protocols. Hence, the network 720 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 720 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 720 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 725 may include a database that stores a virtual model describing a plurality of spaces, wherein one location in the virtual model corresponds to a current configuration of a local area of the headset 705. The mapping server 725 receives, from the headset 705 via the network 720, information describing at least a portion of the local area and/or location information for the local area. The user may adjust privacy settings to allow or prevent the headset 705 from transmitting information to the mapping server 725. The mapping server 725 determines, based on the received information and/or location information, a location in the virtual model that is associated with the local area of the headset 705. The mapping server 725 determines (e.g., retrieves) one or more acoustic parameters associated with the local area, based in part on the determined location in the virtual model and any acoustic parameters associated with the determined location. The mapping server 725 may transmit the location of the local area and any values of acoustic parameters associated with the local area to the headset 705.

One or more components of system 700 may contain a privacy module that stores one or more privacy settings for user data elements. The user data elements describe the user or the headset 705. For example, the user data elements may describe a physical characteristic of the user, an action performed by the user, a location of the user of the headset 705, a location of the headset 705, an HRTF for the user, etc. Privacy settings (or "access settings") for a user data element may be stored in any suitable manner, such as, for example, in association with the user data element, in an index on an authorization server, in another suitable manner, or any suitable combination thereof.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, by a model, an input image showing a human body shape, the input image including color information and depth information of pixels, wherein the model is trained to predict a signed depth field of the human body shape shown in the input image;
generating a set of high-resolution features from the color information of the input image;
generating a set of low-resolution features from the color information of the input image;
generating a three-dimensional voxel grid from the depth information of the input image;
generating a set of voxel-aligned features from the three-dimensional voxel grid and the set of low-resolution features;
generating the signed depth field of the human body shape shown in the input image based on the set of high-resolution features and the set of voxel-aligned features, wherein the signed depth field represents a value based on a distance of a point from a surface of the human body shape; and
rendering, in a virtual reality system, a three-dimensional human body representation reconstructed based on the signed depth field.

2. The method of claim 1, wherein the set of high-resolution features is generated using a high-resolution stacked hourglass neural network component of the model and the set of low-resolution features is generated using a low-resolution stacked hourglass neural network component of the model.

3. The method of claim 1, wherein the set of voxel-aligned features is generated from the three-dimensional voxel grid and the set of low-resolution features using a sparse convolution network component of the model.

4. The method of claim 1, further comprising:
performing bilinear interpolation of the set of high-resolution features; and
performing trilinear interpolation of the set of voxel-aligned features.

5. The method of claim 1, wherein the signed depth field of the human body shape shown in the input image is generated using a multi-layered perceptron component of the model configured to receive the set of high-resolution features and the set of voxel-aligned features as input.

6. The method of claim 1, further comprising:
determining body parts associated with different portions of the input image;
determining a set of three-dimensional points based on the input image, wherein a density of the set of three-dimensional points associated with a portion of the input image is based on a type of body part associated with the portion of the input image; and
training the model via the set of three-dimensional points.

7. The method of claim 1, wherein the model is trained by minimizing:
a first loss function representing a measure of a difference between an estimated signed depth field and a signed depth field available as ground truth of a training data; and
a second loss function representing a measure of a difference between three-dimensional points predicted using the model and three-dimensional points estimated as a point cloud determined from the input image.

8. A computer program product comprising a non-transitory computer readable storage medium having instructions encoded thereon that, when executed by one or more processors, cause the one or more processors to perform steps comprising:
receiving, by a model, an input image showing a human body shape, the input image including color information and depth information of pixels, wherein the model is trained to predict a signed depth field of the human body shape shown in the input image;
generating a set of high-resolution features from the color information of the input image;
generating a set of low-resolution features from the color information of the input image;
generating a three-dimensional voxel grid from the depth information of the input image;
generating a set of voxel-aligned features from the three-dimensional voxel grid and the set of low-resolution features;
generating the signed depth field of the human body shape shown in the input image based on the set of high-resolution features and the set of voxel-aligned features, wherein the signed depth field represents a value based on a distance of a point from a surface of the human body shape; and
rendering, in a virtual reality system, a three-dimensional human body representation reconstructed based on the signed depth field.

9. The computer program product of claim 8, wherein the set of high-resolution features is generated using a high-resolution stacked hourglass neural network component of the model and the set of low-resolution features is generated using a low-resolution stacked hourglass neural network component of the model.

10. The computer program product of claim 8, wherein the set of voxel-aligned features is generated from the three-dimensional voxel grid and the set of low-resolution features using a sparse convolution network component of the model.

11. The computer program product of claim 8, wherein the instructions further cause the one or more processors to perform steps comprising:

performing bilinear interpolation of the set of high-resolution features; and performing trilinear interpolation of the set of voxel-aligned features.

12. The computer program product of claim 8, wherein the signed depth field of the human body shape shown in the input image is generated using a multi-layered perceptron component of the model configured to receive the set of high-resolution features and the set of voxel-aligned features as input.

13. The computer program product of claim 8, wherein the instructions further cause the one or more processors to perform steps comprising:

determining body parts associated with different portions of the input image;

determining a set of three-dimensional points based on the input image, wherein a density of the set of three-dimensional points associated with a portion of the input image is based on a type of body part associated with the portion of the input image; and training the model via the set of three-dimensional points.

14. The computer program product of claim 8, wherein the model is trained by minimizing:

a first loss function representing a measure of a difference between an estimated signed depth field and a signed depth field available as ground truth of a training data; and a second loss function representing a measure of a difference between three-dimensional points predicted using the model and three-dimensional points estimated as a point cloud determined from the input image.

15. A system comprising:

one or more processors; and a non-transitory computer readable storage medium having instructions encoded thereon that, when executed by the one or more processors, cause the one or more processors to perform steps comprising:

receiving, by a model, an input image showing a human body shape, the input image including color information and depth information of pixels, wherein the model is trained to predict a signed depth field of the human body shape shown in the input image;

generating a set of high-resolution features from the color information of the input image;

generating a set of low-resolution features from the color information of the input image;

generating a three-dimensional voxel grid from the depth information of the input image;

generating a set of voxel-aligned features from the three-dimensional voxel grid and the set of low-resolution features;

generating the signed depth field of the human body shape shown in the input image based on the set of high-resolution features and the set of voxel-aligned features, wherein the signed depth field represents a value based on a distance of a point from a surface of the human body shape; and rendering, in a virtual reality system, a three-dimensional human body representation reconstructed based on the signed depth field.

16. The system of claim 15, wherein the set of high-resolution features is generated using a high-resolution stacked hourglass neural network component of the model, the set of low-resolution features is generated using a low-resolution stacked hourglass neural network component of the model, and the set of voxel-aligned features is generated from the three-dimensional voxel grid and the set of low-resolution features using a sparse convolution network component of the model.

17. The system of claim 15, wherein the instructions further cause the one or more processors to perform steps comprising:

performing bilinear interpolation of the set of high-resolution features; and performing trilinear interpolation of the set of voxel-aligned features.

18. The system of claim 15, wherein the signed depth field of the human body shape shown in the input image is generated using a multi-layered perceptron component of the model configured to receive the set of high-resolution features and the set of voxel-aligned features as input.

19. The system of claim 15, wherein the instructions further cause the one or more processors to perform steps comprising:

determining body parts associated with different portions of the input image;

determining a set of three-dimensional points based on the input image, wherein a density of the set of three-dimensional points associated with a portion of the input image is based on a type of body part associated with the portion of the input image; and training the model via the set of three-dimensional points.

20. The system of claim 15, wherein the model is trained by minimizing:

a first loss function representing a measure of a difference between an estimated signed depth field and a signed depth field available as ground truth of a training data; and a second loss function representing a measure of a difference between three-dimensional points predicted using the model and three-dimensional points estimated as a point cloud determined from the input image.

* * * * *